(12) United States Patent
Scheller et al.

(10) Patent No.: US 11,640,054 B2
(45) Date of Patent: May 2, 2023

(54) MULTI-WAVELENGTH SELF-MIXING INTERFEROMETRY

(71) Applicant: Meta Platforms Technologies, LLC, Menlo Park, CA (US)

(72) Inventors: Maik Andre Scheller, Redmond, WA (US); Liliana Ruiz Diaz, Redmond, WA (US); Marc Aurele Gilles, Redmond, WA (US); Andrew John Ouderkirk, Redmond, WA (US); Robert Dale Cavin, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 3 days.

(21) Appl. No.: 17/207,025

(22) Filed: Mar. 19, 2021

(65) Prior Publication Data

US 2022/0299761 A1    Sep. 22, 2022

(51) Int. Cl.
  *G02B 27/00*  (2006.01)
  *G01B 9/02*   (2022.01)
  *G02B 27/01*  (2006.01)
  *H04N 5/33*   (2006.01)

(52) U.S. Cl.
  CPC ..... *G02B 27/0093* (2013.01); *G01B 9/02092* (2013.01); *G02B 27/0172* (2013.01); *H04N 5/33* (2013.01); *G02B 2027/0138* (2013.01); *G02B 2027/0178* (2013.01)

(58) Field of Classification Search
  CPC ............ G02B 27/0093; G02B 27/0172; G02B 2027/0138; G02B 2027/0178; G01B 9/02092; H04N 5/33
  See application file for complete search history.

(56) References Cited

U.S. PATENT DOCUMENTS

| 2008/0186547 | A1* | 8/2008 | Shimizu | G03H 1/2645 |
| | | | | 359/13 |
| 2017/0205876 | A1 | 7/2017 | Vidal et al. | |
| 2021/0302745 | A1* | 9/2021 | Mutlu | G03B 17/12 |

FOREIGN PATENT DOCUMENTS

| DE | 102016226294 A1 | 7/2018 |
| WO | 0237411 A1 | 5/2002 |
| WO | 2021049740 A1 | 3/2021 |

OTHER PUBLICATIONS

U.S. Appl. No. 16/918,229, filed unknown, Maik Andre Scheller.
U.S. Appl. No. 17/167,005, filed unknown, Maik Andre Scheller.
Invitation to Pay Additional Fees for International Application PCT/US2022/020759, dated Jul. 5, 2022, 9 pages.

(Continued)

*Primary Examiner* — Alexander Eisen
*Assistant Examiner* — Kebede T Teshome
(74) *Attorney, Agent, or Firm* — Freestone Intellectual Property Law PLLC; Aaron J. Visbeek

(57) ABSTRACT

An eyebox region is illuminated with first coherent light and second coherent light having a different wavelength than the first coherent light. A first self-mixed interferometer (SMI) signal is generated in response to first feedback light received back from the eyebox region. A second SMI signal is generated in response to second feedback light received back from the eyebox region. Eye data is generated in response to at least the first SMI signal and the second SMI signal.

20 Claims, 7 Drawing Sheets

(56) References Cited

OTHER PUBLICATIONS

Yanguany, Yu; Yuanlong, Fan; Bin Liu, Self-Mixing interferometry and its application, 2016, 15 pages, vol. 10021, pp. 100210U-1-100210U-13, Optical Design and Testing VII, University of Wollongong Australia.

International Search Report and Written Opinion for International Application PCT/US2022/020759, dated Aug. 26, 2022, 14 pages.

* cited by examiner

MULTI-WAVELENGTH SELF-MIXING INTERFEROMETRY

TECHNICAL FIELD

This disclosure relates generally to optics and in particular to optical sensing.

BACKGROUND INFORMATION

A variety of electrical and optical sensors have been developed to measure proximity and/or distance. Self-Mixing Interferometry sensors are optical sensors that may be used for measurements, for example. SMI sensors could benefit from increasing the accuracy of measurements, and in particular, the accuracy of total distance determinations could be improved.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
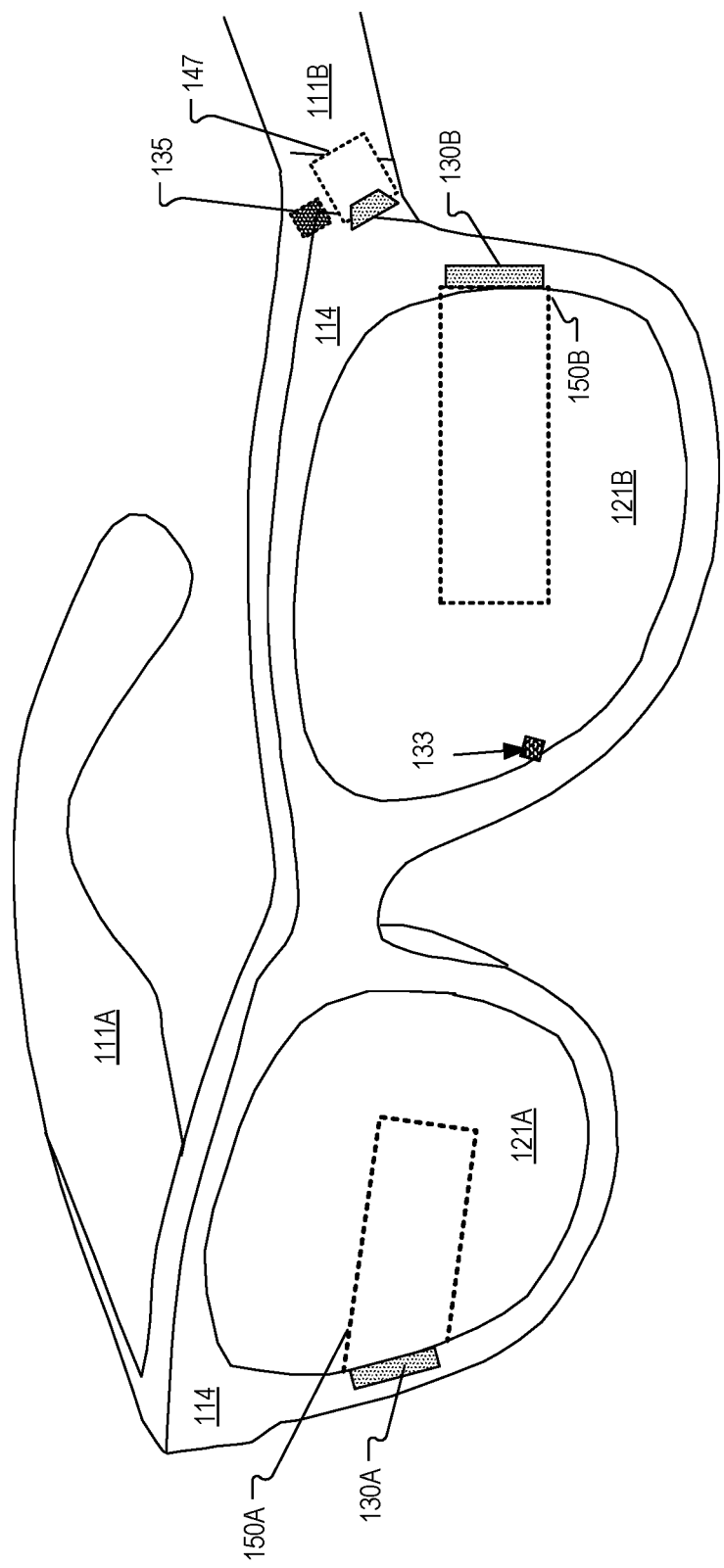
FIG. 1 illustrates an example head mounted device that includes a multi-wavelength self-mixed interferometer (SMI), in accordance with aspects of the disclosure.

Embodiments of multi-wavelength self-mixing interferometry are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light has a wavelength range of approximately 700 nm-1 mm. Infrared light may include near-infrared light. In aspects of this disclosure, near-infrared light may be defined as having a wavelength range of approximately 700 nm-1.4 µm.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, the term "transparent" may be defined as having greater than 90% transmission of light. In some aspects, the term "transparent" may be defined as a material having greater than 90% transmission of visible light.

Self-Mixing Interferometry techniques include emitting coherent light from a light source (e.g. a laser) and generating a Self-Mixing Interferometer (SMI) signal in response to feedback light that is received by the optical cavity of the light source. Typically, an SMI sensor includes a light source (e.g. a laser) and a light sensor (e.g. a photodiode) optically coupled to receive an optical signal from the optical cavity of the light source. SMI sensors could benefit from increasing the accuracy of measurements, and in particular, the accuracy of total distance determinations could be improved.

Embodiments of the disclosure include multi-wavelength SMI systems and/or sensors to increase accuracy of distant measurements and/or velocity measurements of a target. In the particular context of head mounted devices, a multi-wavelength SMI system or sensor may improve the accuracy of absolute position measurements of an eye of a user with respect to the head mounted device and/or improve the accuracy of velocity measurements of the eye of the user with respect to the head mounted device. Using a multi-wavelength SMI architecture would provide the improved accuracy without the associated bulk of an Optical Coherence Tomography (OCT) system that scans a laser across a large wavelength range. These and other embodiments are described in more detail in connection with FIGS. 1-5.

FIG. 1 illustrates an example head mounted device 100 that includes a multi-wavelength self-mixed interferometer (SMI), in accordance with aspects of the disclosure. Head mounted device 100 includes frame 114 coupled to arms 111A and 111B. Lenses 121A and 121B are mounted to frame 114. Lenses 121 may be prescription lenses matched to a particular wearer of head mounted device 100 or non-prescription lenses. The illustrated head mounted device 100 is configured to be worn on or about a head of a user of the head mounted device.

The frame 114 and arms 111 of the head mounted device 100 may include supporting hardware of head mounted device 100. Head mounted device 100 may be considered "electronic glasses" since head mounted device includes electronics. Head mounted device 100 may include any of processing logic, wired and/or wireless data interface for sending and receiving data, graphic processors, and one or more memories for storing data and computer-executable instructions. In one embodiment, head mounted device 100 may be configured to receive wired power. In one embodiment, head mounted device 100 is configured to be powered by one or more batteries. In one embodiment, head mounted device 100 may be configured to receive wired data including video data via a wired communication channel. In one embodiment, head mounted device 100 is configured to receive wireless data including video data via a wireless communication channel.

Head mounted device 100 may be a head mounted display (HMD) when head mounted device 100 is configured with a near-eye display for presenting images to the eye of a user. In FIG. 1, each lens 121 includes a waveguide 150 to direct display light generated by a display 130 to an eyebox area for viewing by a wearer of head mounted device 100. Display 130 may include an LCD, an organic light emitting diode (OLED) display, micro-LED display, quantum dot display, pico-projector, or liquid crystal on silicon (LCOS) display for directing display light to a wearer of head mounted device 100. Near-eye display architectures that are different from the example implementation illustrated in FIG. 1 may of course be used as alternatives, in some implementations.

Lenses 121 may appear transparent to a user to facilitate augmented reality or mixed reality where a user can view scene light from the environment around her while also receiving display light directed to her eye(s) by waveguide(s) 150. Consequently, lenses 121 may be considered (or include) an optical combiner. In some embodiments, display light is only directed into one eye of the wearer of head mounted device 100. In an embodiment, both displays 130A and 130B are included to direct display light into waveguides 150A and 150B, respectively.

The example head mounted device 100 of FIG. 1 includes a camera 147. Camera 147 may include a complementary metal-oxide semiconductor (CMOS) image sensor. An infrared filter that receives a narrow-band infrared wavelength may be placed over the image sensor so it is sensitive to the narrow-band infrared wavelength while rejecting visible light and wavelengths outside the narrow-band. Infrared illuminators (not illustrated) such as infrared LEDs or vertical-cavity surface-emitting lasers (VCSELs) that emit the narrow-band wavelength may be oriented to illuminate an eyebox area with the narrow-band infrared wavelength. In one embodiment, the infrared light is near-infrared light. In an implementation, the near-infrared light is centered around 850 nm. Camera 147 may be mounted on the inside of the temple of head mounted device 100. The images of the eye captured by camera 147 may be used for eye-tracking purposes, or otherwise. Camera 147 may directly image the eye or image the eye by way of an optical combiner (not illustrated) included in lens 121B that directs infrared light (reflected or scattered by the eye of the user) to camera 147.

The example head mounted device 100 of FIG. 1 includes an example in-field element 133 and an example out-of-field element 135. In-field element 133 will be in a field of view (FOV) of a user of head mounted device 100 since element 133 is included in lens 121B. Out-of-field element 135 will be out of the FOV of a user of head mounted device 100. The multi-wavelength SMI sensors and systems of this disclosure may have an in-field element and/or an out-of-field element. While not specifically illustrated, SMI sensing hardware may also be associated with lens 121A. Although camera 147 and elements 133 and 135 are illustrated on only one side of head mounted device 100, they of course may be duplicated on the other side of head mounted device 100 (e.g. near lens 121A) to facilitate imaging of both eyes of a wearer of head mounted device 100.

Figure 2:
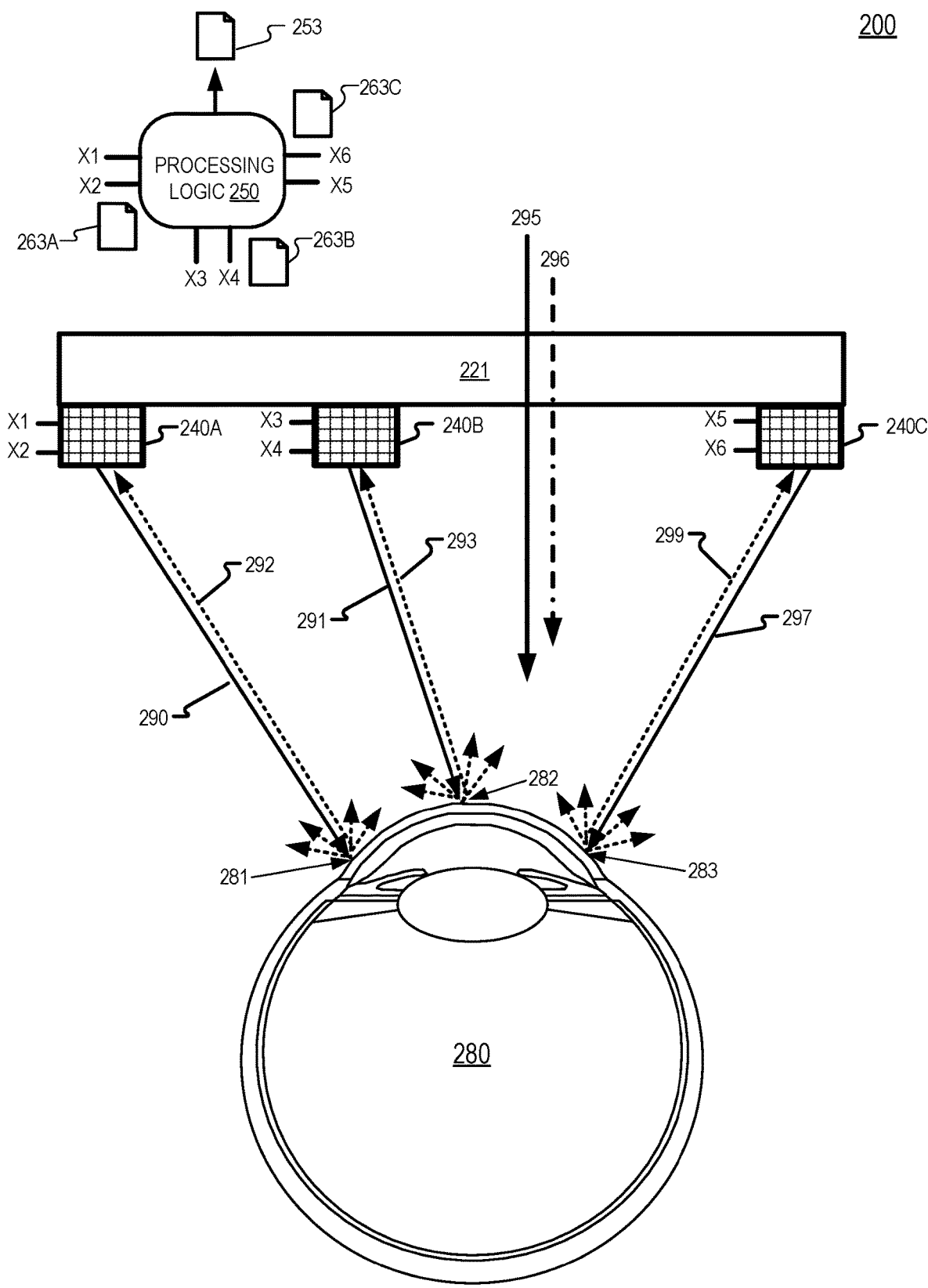
FIG. 2 illustrates an example multi-wavelength SMI implementation that includes a plurality of SMI sensors, in accordance with aspects of the disclosure.

FIG. 2 illustrates an example multi-wavelength SMI implementation 200 that includes a plurality of SMI sensors, in accordance with aspects of the disclosure. While SMI implementation 200 may be used in a variety of contexts, some example illustrations of the disclosure are illustrated in the context of near-eye sensing for eye-tracking of eye 280. SMI implementation 200 illustrates that SMI sensors 240A, 240B, and 240C (collectively referred to as SMI sensors 240) may be coupled with a transparent or semi-transparent optical element 221. Optical element 221 may be included in lenses 121 of FIG. 1, for example. Optical element 221 may pass (transmit) scene light 295 from an environment of a user of a head mounted device 100 to eye 280. FIG. 2 also illustrates that in implementations where a head mounted device is also an HMD, optical element 221 may pass display light 296 to eye 280 to present images included in display light 296 to the eye 280 of a user of an HMD. All or a portion of SMI sensors 240 may be positioned to be out-of-field of eye 280 of a user of a head mounted device such as head mounted device 100. In some implementations, all or a portion of SMI sensors 240 may be positioned to be within a FOV of eye 280 of a user of head mounted device 100.

Each SMI sensor 240A, 240B, and 240C includes a light source (e.g. a near-infrared laser) and a light sensor (e.g. a photodiode). Therefore, the first SMI sensor 240A includes a first light source and a first light sensor, the second SMI sensor 240B includes a second light source and a second light sensor, and third SMI sensor 240C includes a third light source and a third light sensor. The light source may be an infrared light source emitting infrared light. The light source may be a near-infrared light source emitting near-infrared light. The light source emits coherent light. The light source may be a laser. The light sensor may be a photodiode.

Three SMI sensors emitting different wavelengths of light are illustrated in FIG. 2, although implementations of the disclosure may include two or more SMI sensors that emit different wavelengths of light. In the illustrated example, the first light source of first SMI sensor 240A emits first coherent light 290 having a first wavelength. The second light source of second SMI sensor 240B emits second coherent light 291 having a second wavelength that is different from the first wavelength. The third light source of third SMI sensor 240C emits third coherent light 297 having a third wavelength different from the first wavelength and different from the second wavelength. By illuminating the eyebox with a plurality of wavelengths, the multi-wavelength SMI implementation 200 achieves increased accuracy of absolute position measurements of an eye 280 of a user with respect to the head mounted device and/or improves the accuracy of velocity measurements of the eye of the user with respect to the head mounted device.

Figure 3:
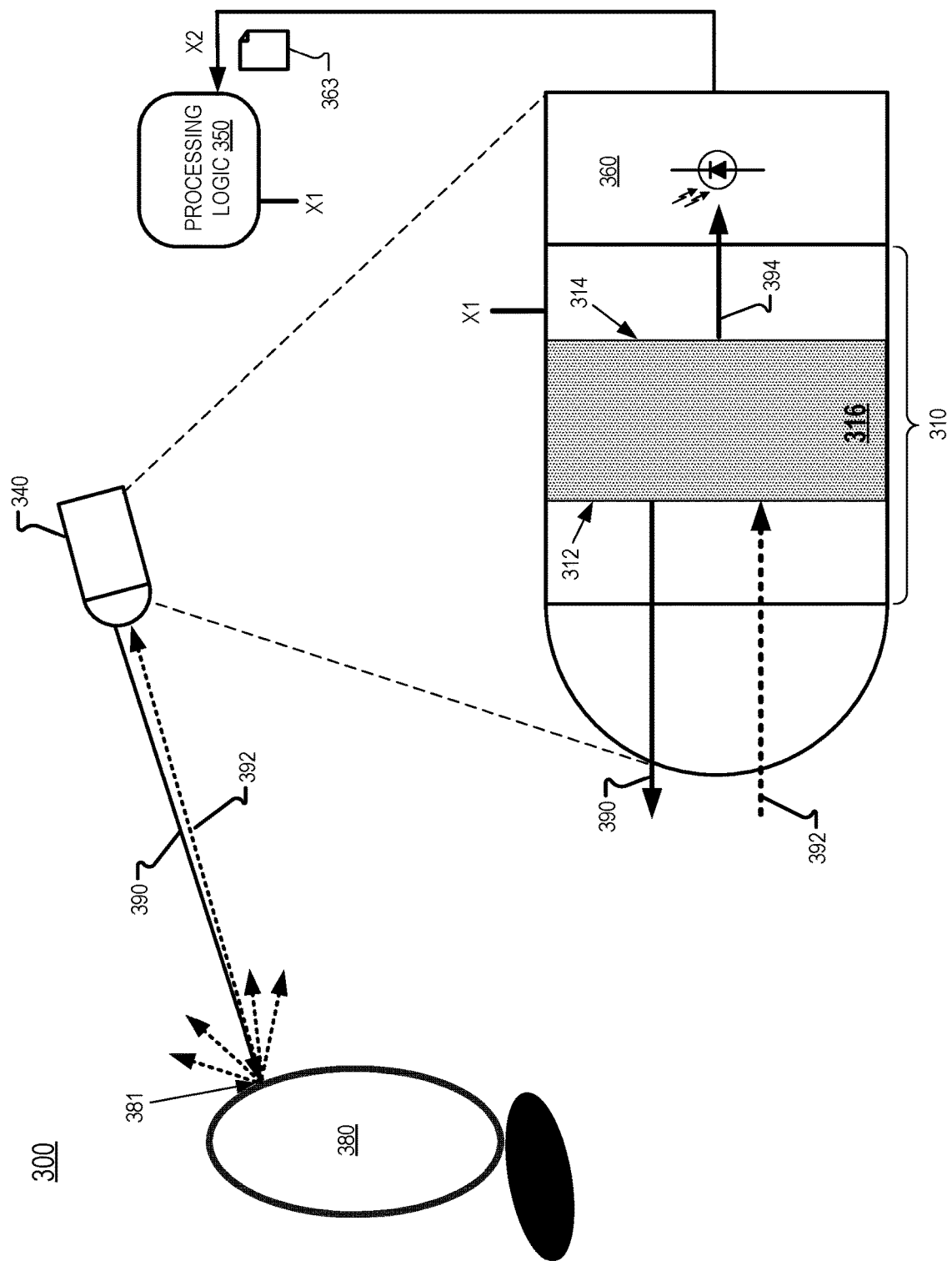
FIG. 3 illustrates an exploded view of an example SMI sensor, in accordance with aspects of the disclosure.

FIG. 3 illustrates an exploded view of an example SMI sensor 340 that may be used as any of SMI sensors 240, in accordance with aspects of the disclosure. The exploded view of SMI sensor 340 (indicated by diagonal dashed lines) shows that SMI sensor 340 includes a light source 310 and a light sensor 360. The example light sensor 360 is illustrated as a photodiode but light sensor 360 may be an alternative photosensor.

Light source 310 includes a cavity 316 (e.g. an optical cavity, which may be a laser cavity) defined by two reflective elements (e.g. reflective surfaces 312 and 314). In some embodiments, the reflective elements are distributed Bragg reflectors. In some embodiments, the light source 310 may be a laser source, such as a vertical cavity surface emitting laser (VCSEL) or a vertical external cavity surface emitting laser (VECSEL).

Optical cavity 316 is used to generate coherent light 390 and light source 310 is positioned to output at least a portion of the coherent light 390 towards object 380. Surface 312 is semi-reflective (e.g. surface 312 is a partially reflective and partially transmissive mirror). For example, the reflectance of the surface 314 is greater than the reflectance of the surface 312 (e.g. surface 314 has a reflectance of 100%, 99.99%, 99.9%, 99%, 98%, 97%, 96%, 95%, 90% or an interval between any two of the aforementioned values, and surface 312 has a reflectance of 99.99%, 99.9%, 99%, 98%, 97%, 96%, 95%, 90% or an interval between any two of the aforementioned values). In some configurations, surface 312 has a transmittance of at least 0.01%, 0.1%, 1%, or an interval between any two of the aforementioned values. Surface 312 reflects a portion of the light propagating toward the surface 312 within the cavity 316 back toward surface 314 and transmits a portion of the light propagating toward surface 312 within optical cavity 316 (e.g. surface 312 is configured to reflect at least a portion of the light generated inside the cavity 316 back into cavity 316 and to transmit at least a portion of the light generated inside the cavity 316). The transmitted light is emitted from light source 310 as coherent light 390. SMI sensor 340 (and hence, light source 310 of the SMI sensor 340) is configured to (e.g. positioned to) receive, via surface 312, at least a portion of the coherent light back from object 380 as feedback light 392. Object 380 reflects or scatters a portion of the incident coherent light 390 back to surface 312 as feedback light 392. Feedback light 392 may propagate along an optical path that is considered the reverse optical path of coherent light 390 that becomes incident onto a given target location. Feedback light 392 enters optical cavity 316 of light source 310 and interferes with the generation of the coherent light inside optical cavity 316, leading to a modulation of the intensity of the generated coherent light. The intensity of the light may be defined as the radiant flux (power) received by a surface per unit area.

Modulated coherent light 394 (e.g. coherent light with modulated intensity) is output from the light source 310 (e.g. output from cavity 316) and at least a portion of the modulated coherent light 394 is received and detected by the light sensor 360. Light sensor 360 is configured to generate one or more SMI signals 363 based on the detected intensity (e.g. modulated intensity) of the modulated coherent light 394. Information regarding movement information of object 380 (e.g. movement of the pupil of an eye 280) can be determined by analyzing the modulated coherent light 394 or the one or more SMI signals 363 generated by light sensor 360. SMI signal 363 may be generated in response to an electrical current generated by a photodiode of light sensor 360 in response to modulated coherent light 394, for example.

This measurement technique is known as "self-mixing interferometry," where coherent light (e.g. a laser beam) is reflected from a target (e.g. a target object such as an eye) back into the light source (e.g. the laser cavity) and the reflected light interferes with, and modulates, the coherent light generated inside the light source (e.g. modulates the power and/or intensity of the light generated by the light source). Position and/or movement information regarding the target can be determined from (e.g. based on, using) intensity or power measurements of the modulated coherent light. The self-mixing interferometry is also called "feedback interferometry," "induced-modulation interferometry," and "backscatter modulation interferometry."

SMI sensor 340 (and hence, light source 310 of SMI sensor 340) is configured to (e.g. positioned to) output coherent light 390, via surface 312, towards an object 380. In some contexts of the disclosure, object 380 may be an eye or an eyebox area of a user of a head mounted device. In some contexts of the disclosure, object 380 is a hand, fingers, or portion of a face. SMI sensor 340 (and hence, light source 310 of the SMI sensor 340) is also configured to (e.g. positioned to) receive, via surface 312, at least a portion of the coherent light back from object 380 as feedback light 392. Object 380 reflects or scatters a portion of the incident coherent light 390 back to surface 312 as feedback light 392. Since the surface 314 is semi-reflective (e.g. a partially reflective and partially transmissive mirror), at least a portion of the coherent light generated inside the cavity 316 is output from the light source 310, via the surface 314, toward light sensor 360. Light sensor 360 is configured to (e.g. positioned to) receive (e.g. detect) at least a portion of the modulated coherent light 394 output from the light source 310 via the surface 314, and generate one or more SMI signals 363 based on the detected intensity (e.g. modulated intensity) of the modulated coherent light 394.

Example system 300 of FIG. 3 includes processing logic 350 configured to receive one or more SMI signals 363 from light sensor 360 of SMI sensor 340 via communication channel X2. In the example illustration of FIG. 3, processing logic 350 is configured to activate light source 310 by way of communication channel X1. Activating light source 310 may include turning light source 310 on and/or modulating light source 310 with an electrical current or electrical voltage, for example.

Referring back to FIG. 2, processing logic 250 is configured to receive SMI signals 263 from the SMI sensors 240. In the particular example of FIG. 2, processing logic 250 is configured to receive first SMI signal 263A via communication channel X2 from first SMI sensor 240A. First SMI signal 263A is generated by a first light sensor of first SMI sensor 240A in response to first feedback light 292 entering a first optical cavity of the first light source. First feedback light 292 is a portion of first coherent light 290 received back from an eyebox region, illustrated particularly as eyebox location 281 in the example illustration of FIG. 2.

Processing logic 250 is also configured to receive second SMI signal 263B via communication channel X4 from second SMI sensor 240B. Second SMI signal 263B is generated by a second light sensor of second SMI sensor 240B in response to second feedback light 293 entering a second optical cavity of the second light source. Second feedback light 293 is a portion of second coherent light 291 received back from an eyebox region, illustrated particularly as eyebox location 282 in the example illustration of FIG. 2.

Processing logic 250 is further configured to receive third SMI signal 263C via communication channel X6 from third SMI sensor 240C. Third SMI signal 263C is generated by a third light sensor of third SMI sensor 240C in response to third feedback light 299 entering a third optical cavity of the third light source. Third feedback light 299 is a portion of third coherent light 297 received back from an eyebox region, illustrated particularly as eyebox location 283 in the example illustration of FIG. 2.

In some implementations, a first light source of first SMI sensor 240A is configured to illuminate a first eyebox location (e.g. eyebox location 281) with first coherent light and a second light source of second SMI sensor 240B is configured to illuminate that same first eyebox location with second coherent light 291. Of course, a third light source of third SMI sensor 240C may also be configured to illuminate the first eyebox location with third coherent light 297, in some implementations. In this implementation, SMI sensors 240A, 240B, and 240C may be co-located or even consolidated into a same electronics package.

Processing logic 250 is configured to generate eye data 253 in response to at least a first SMI signal (e.g. signal 263A) and a second SMI signal (e.g. signal 263B). Of course, processing logic 250 may generate eye data 253 in response to third SMI signal 263C and additional SMI signals in implementations that include more than three SMI sensors emitting different wavelengths of coherent light. Processing logic 250 may also generate eye data 253 in response to a first prior SMI signal generated by first SMI sensor 240A and in response to a second prior SMI signal generated by second SMI sensor 240B. For example, prior SMI signals may be used to determine a prior position of the eye and the prior SMI signal is compared to the subsequent SMI signal (e.g. SMI signal 263) to generate a velocity measurement. Eye data 253 may include eye distance data and/or eye velocity data. The eye distance data may be generated based on a depth of eye 280 from a first optical cavity of first SMI sensor 240A and a second depth of eye 280 from the second optical cavity of second SMI sensor 240B. In contexts where the measurement target is other than an eye (e.g. face, hand, and/or finger), data 253 may be target data and include distance data to the target and/or velocity data of the target.

Processing logic 250 may be configured to activate a first light source of first SMI sensor 240A by way of communication channel X1 to emit coherent light 290. Processing logic 250 may also be configured to activate a second light source of second SMI sensor 240B by way of communication channel X3 to emit coherent light 291 and configured to activate a third light source of third SMI sensor 240C by way of communication channel X5 to emit coherent light 297.

In operation, processing logic 250 may activate one or more of the light sources of SMI sensors 240 to illuminate eye 280 with coherent light having different wavelengths. The different wavelengths of coherent light may all be within a near-infrared band. The linewidth of the coherent light from the light sources of the SMI sensors 240 may be plus-or-minus two nm, in some implementations. In some implementations, first coherent light 290 is emitted simultaneously with second coherent light 291. Third coherent light 297 may also be emitted simultaneously with first coherent light 290 and second coherent light 291.

Figure 4A:
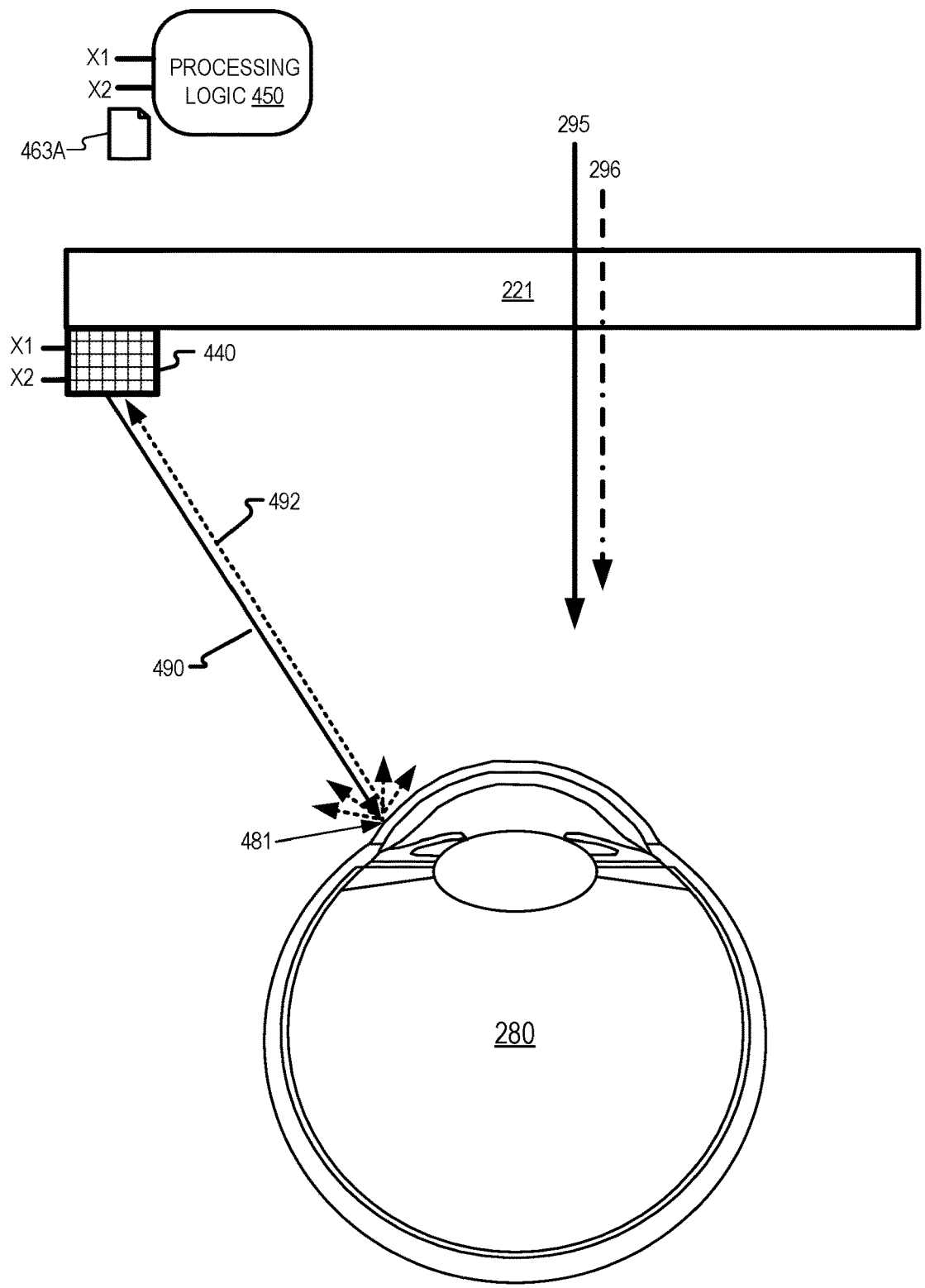
FIGS. 4A-4C illustrate a multi-wavelength SMI implementation including an SMI sensor having a swept-source laser as a light source, in accordance with aspects of the disclosure.
Figure 4B:
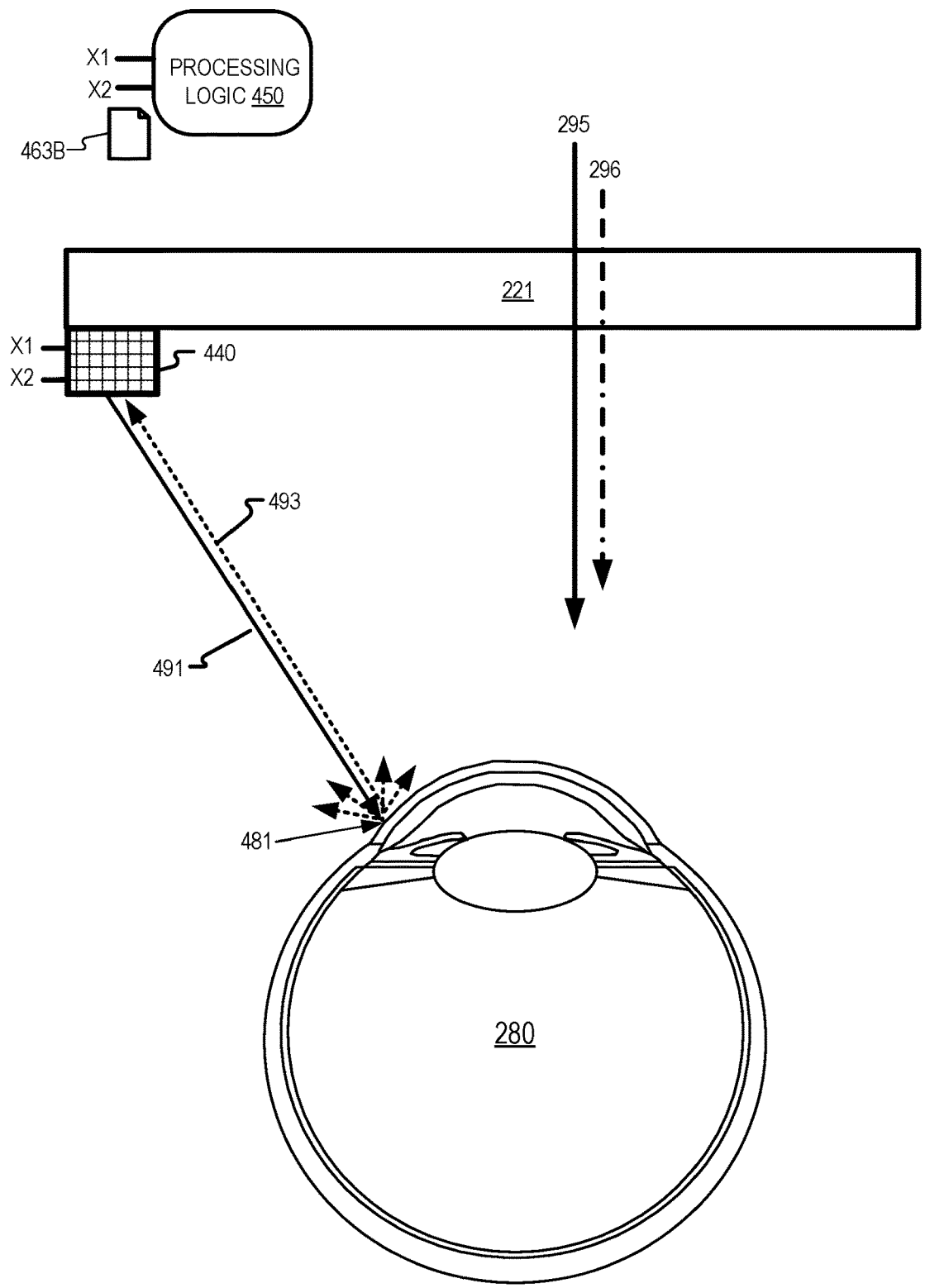
Figure 4C:
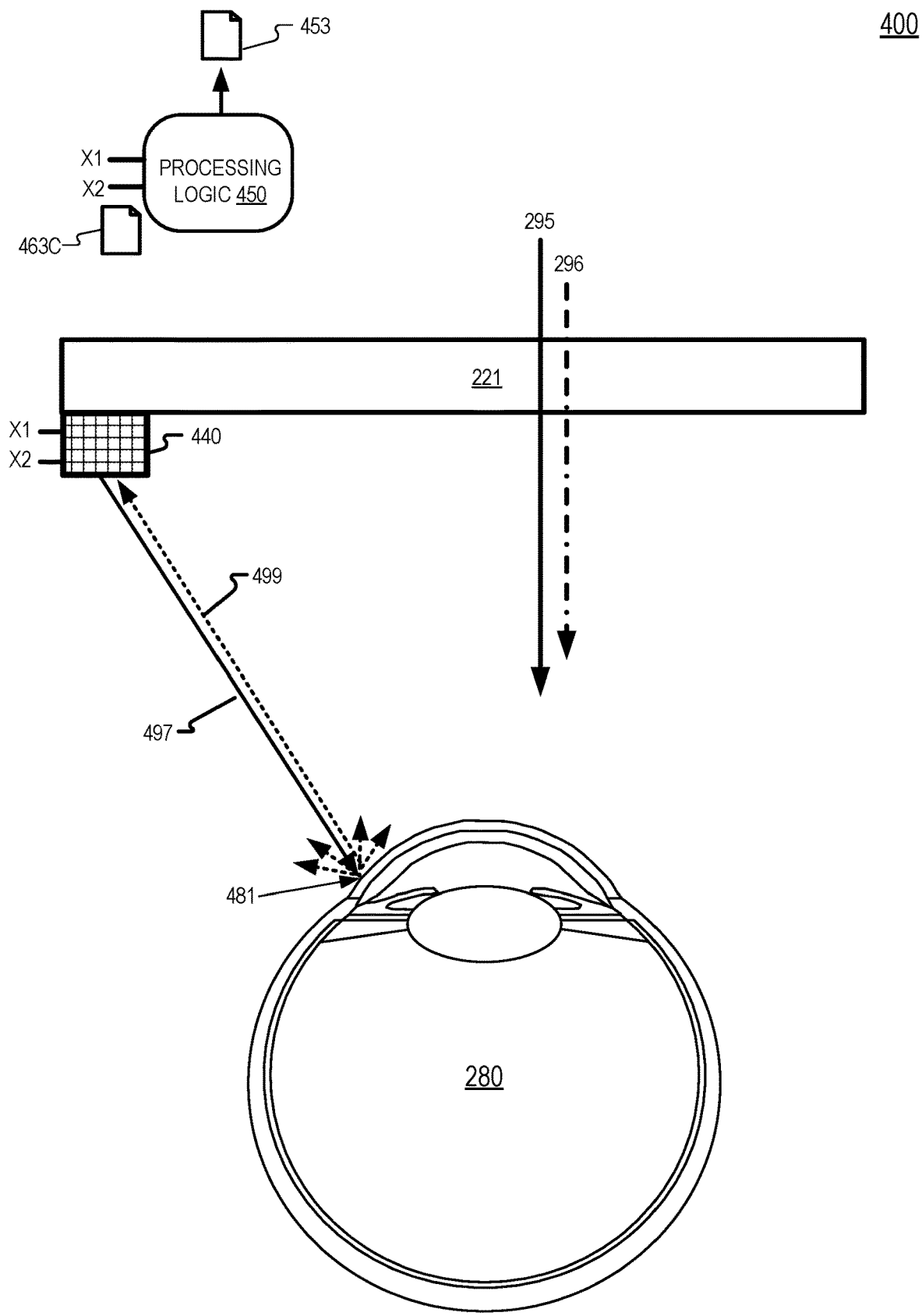

FIGS. 4A-4C illustrate a multi-wavelength SMI implementation 400 including an SMI sensor 440 having a swept-source laser as a light source, in accordance with aspects of the disclosure. FIG. 4A illustrates SMI sensor 440 may be coupled with optical element 221. SMI sensor 440 may be positioned to be out-of-field of eye 280 or in a FOV of eye 280. Processing logic 450 is communicatively coupled to SMI sensor 440 by way of communication channel X2. Processing logic 450 is configured to receive SMI signals 463A, 463B, and 463C by way of communication channel X2.

SMI sensor 440 includes a swept-source laser as its light source. Thus, the light source 310 of SMI sensor 340 would be replaced with a swept-source laser. The swept-source laser may be a near-infrared swept-source laser. The swept-source laser may be configured to execute a broad wavelength scan (e.g. 15 nm or 100 nm) at a relatively high sweep frequency (e.g. 10 kHz to 1 MHz) to provide improved accuracy for distance measurements. Swept-source lasers can be driven to adjust the wavelength of the laser light outputted by the laser and may also be referred to as "wavelength-swept lasers" or "tunable lasers" by those skilled in the art. Processing logic 450 is configured to control the swept-source laser to sweep through different wavelengths of coherent light via communication channel X1. Controlling the swept-source laser may include modulating the swept-source laser with an electrical current or electrical voltage to scan through different wavelengths of laser light, for example.

FIG. 4A illustrates that at a first time period, processing logic 450 is configured to drive the swept-source laser of SMI sensor 440 to emit first coherent light 490 having a first wavelength. The light sensor of SMI sensor 440 generates a first SMI signal 463A in response to first feedback light 492 received back from the target (eye 280 is the example target in FIGS. 4A-4C). First feedback light 492 is a portion of the first wavelength of the first coherent light 490 received back from the target. In the illustrated example, first coherent light 490 illuminates a first eyebox location 481. Processing logic 450 is configured to receive and measure first SMI signal 463A.

FIG. 4B illustrates that at a second time period, processing logic 450 is configured to drive the swept-source laser of SMI sensor 440 to emit second coherent light 491 having a second wavelength that is different from the first wavelength of first coherent light 490. The light sensor of SMI sensor 440 generates a second SMI signal 463B in response to second feedback light 493 received back from the target. Second feedback light 493 is a portion of the second wavelength of the second coherent light 491 received back from the target. In the illustrated example, second coherent light 491 illuminates first eyebox location 481. Processing logic 450 is configured to receive and measure second SMI signal 463B.

FIG. 4C illustrates that at a third time period, processing logic 450 is configured to drive the swept-source laser of SMI sensor 440 to emit third coherent light 497 having a third wavelength that is different from the first wavelength of first coherent light 490 and different from the second wavelength of second coherent light 491. The light sensor of SMI sensor 440 generates a third SMI signal 463C in response to third feedback light 499 received back from the target. Third feedback light 499 is a portion of the third wavelength of third coherent light 497 received back from the target. In the illustrated example, third coherent light 497 illuminates first eyebox location 481. Processing logic 450 is configured to receive and measure third SMI signal 463C.

Target data 453 may be generated by processing logic 450 in response to receiving two or more SMI signals 463. In the illustrated implementations, target data 453 is generated in response to first SMI signal 463A, second SMI signal 463B, and third SMI signal 463C. While only three time periods and three SMI signals 463 are illustrated in FIGS. 4A-4C, those skilled in the art appreciated that hundreds or thousands of SMI signals per second may be generated by SMI sensor 440 as the swept-source laser progresses through its scan. Thus, processing logic 450 may receive a plurality of SMI signals prior to generating target data 453 illustrated in FIG. 4C. Of course, target data 453 may be referred to as eye data 453 in the context of scanning eye 280.

Figure 5:
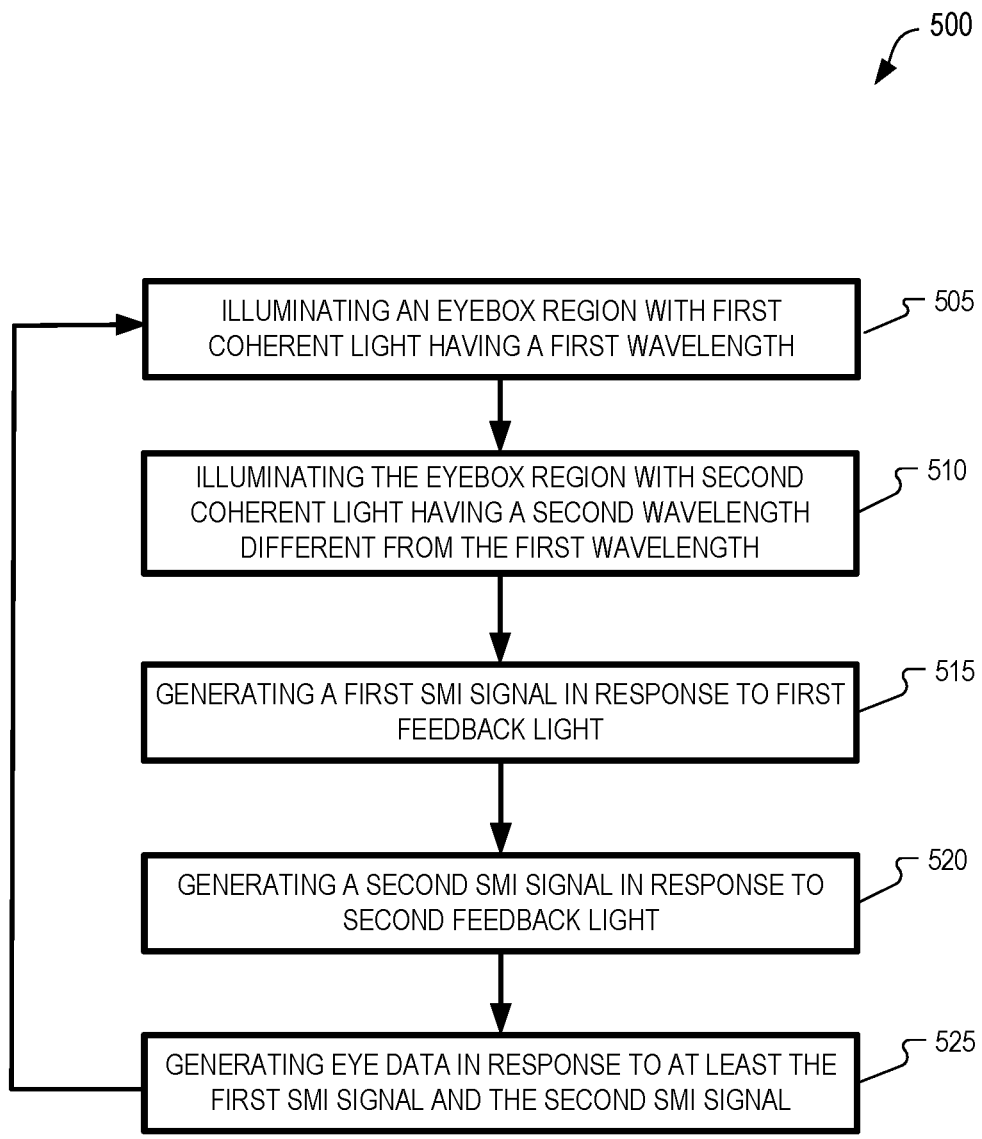
FIG. 5 illustrates a process of eye-tracking using a multi-wavelength SMI architecture, in accordance with aspects of the disclosure.

FIG. 5 illustrates a process 500 of eye-tracking using a multi-wavelength SMI architecture, in accordance with aspects of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

In process block 505, an eyebox region is illuminated with first coherent light having a first wavelength.

In process block 510, the eyebox region is illuminated with second coherent light having a second wavelength that is different from the first wavelength. The first wavelength and the second wavelength may be different wavelengths of near-infrared light.

In process block 515, a first SMI signal is generated in response to first feedback light. The first feedback light is a portion of the first coherent light received back from the eyebox region.

In process block 520, a second SMI signal is generated in response to second feedback light. The second feedback light is a portion of the second coherent light received back from the eyebox region.

In process block 525, eye data is generated in response to at least the first SMI signal and the second SMI signal. Process 500 may return to process block 505 to continue scanning the eyebox region.

In a multi-wavelength SMI implementation that includes a swept-source laser (e.g. implementation 400), the first coherent light in process 500 may be coherent light 490 and the first feedback light may be feedback light 492. The first coherent light may be emitted by a swept-source laser of an SMI sensor (e.g. sensor 440) during a first time period and the first SMI signal (e.g. signal 463A) is generated by a light sensor optically coupled to a swept-source optical cavity of the SMI sensor. The second coherent light in process 500 may be coherent light 491 and the second feedback light may be feedback light 493. The second coherent light may be emitted by the swept-source laser during a second time period and the second SMI signal (e.g. signal 463B) is generated by the light sensor optically coupled to the swept-source optical cavity of the SMI sensor. In this context, the eyebox region may be illuminated by the second coherent light subsequent to being illuminated by the first coherent light and the eye data is eye data 453. The first coherent light and the second coherent light may illuminate the same eyebox location (e.g. eyebox location 481). If process 500 is implemented in the context of implementation 400, process 500 may be executed partially or entirely by processing logic 450.

In a multi-wavelength SMI implementation that includes multiple SMI sensors (e.g. implementation 200), the first coherent light in process 500 may be coherent light 290 and the first feedback light may be feedback light 292. The first coherent light may be emitted by a first light source of a first optical cavity of a first SMI sensor (e.g. sensor 240A) and the first SMI signal (e.g. signal 263A) is generated by a first light sensor optically coupled to the first optical cavity of the first SMI sensor. The second coherent light in process 500 may be coherent light 291 and the second feedback light may be feedback light 293. The second coherent light may be emitted by a second light source of a second optical cavity of a second SMI sensor and the second SMI signal is generated by a second light sensor optically coupled to the second optical cavity of the second SMI sensor. In this context, the first coherent light and the second coherent light may be emitted simultaneously. In some implementations, the first coherent light may illuminate a first eyebox location (e.g. eyebox location 281) and the second coherent light may illuminate a second eyebox location (e.g. eyebox location 282). If process 500 is implemented in the context of implementation 200 of FIG. 2, process 500 may be executed partially or entirely by processing logic 250.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. processing logic 250, 350, or 450) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Communication channels may include or be routed through one or more wired or wireless communication utilizing IEEE 802.11 protocols, BlueTooth, SPI (Serial Peripheral Interface), $I^2C$ (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described.

Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eye-tracking system comprising:
   a first self-mixed interferometer (SMI) including:
     a first near-infrared light source including a first optical cavity configured to emit first coherent light toward an eyebox region, the first coherent light having a first near-infrared wavelength; and
     a first light sensor configured to generate a first SMI signal in response to first feedback light entering the first optical cavity, the first feedback light being a portion of the first coherent light received back from the eyebox region; and
   a second SMI including:
     a second near-infrared light source including a second optical cavity configured to emit second coherent light toward the eyebox region, the second coherent light having a second near-infrared wavelength that is different from the first near-infrared wavelength; and
     a second light sensor configured to generate a second SMI signal in response to second feedback light entering the second optical cavity, the second feedback light being a portion of the second coherent light received back from the eyebox region.

2. The eye-tracking system of claim 1 further comprising:
   processing logic configured to receive the first SMI signal and the second SMI signal, wherein the processing logic generates eye data in response to at least the first SMI signal and the second SMI signal.

3. The eye-tracking system of claim 2, wherein the eye data is also generated in response to a first prior SMI signal and a second prior SMI signal, wherein the first SMI signal was generated subsequent to the first light sensor generating the first prior SMI signal, and wherein the second SMI signal was generated subsequent to the second light sensor generating the second prior SMI signal.

4. The eye-tracking system of claim 3, wherein the eye data include eye distance data and eye velocity data, wherein the eye distance data is generated based on a depth of an eye from the first optical cavity and a second depth of the eye from the second optical cavity.

5. The eye-tracking system of claim 1 further comprising:
   a third SMI including:
     a third near-infrared light source including a third optical cavity configured to emit third coherent light toward the eyebox region, the third coherent light having a third near-infrared wavelength that is different from the first near-infrared wavelength and the second near-infrared wavelength; and
     a third light sensor configured to generate a third SMI signal in response to third feedback light entering the third optical cavity, the third feedback light being a portion of the third coherent light received back from the eyebox region.

6. The eye-tracking system of claim 1, wherein the first near-infrared light source is configured to illuminate a first eyebox location with the first coherent light, and wherein the second near-infrared light source is configured to illuminate a second eyebox location with the second coherent light, the first eyebox location being different from the second eyebox location.

7. The eye-tracking system of claim 1, wherein the first near-infrared light source is configured to illuminate a first eyebox location with the first coherent light, and wherein the second near-infrared light source is also configured to illuminate the first eyebox location with the second coherent light.

8. The eye-tracking system of claim 1, wherein the first SMI and the second SMI are coupled with a head mounted device, and wherein the first SMI and the second SMI are configured to be out-of-field of an eye of a user of the head mounted device.

9. The eye-tracking system of claim 1, wherein the first coherent light and the second coherent light are emitted simultaneously.

10. An eye-tracking method comprising:
    illuminating an eyebox region with first coherent light having a first wavelength;
    illuminating the eyebox region with second coherent light having a second wavelength different from the first wavelength;
    generating a first self-mixed interferometer (SMI) signal in response to first feedback light, the first feedback light being a portion of the first coherent light received back from the eyebox region;
    generating a second SMI signal in response to second feedback light, the second feedback light being a portion of the second coherent light received back from the eyebox region; and
    generating eye data in response to at least the first SMI signal and the second SMI signal.

11. The eye-tracking method of claim 10, wherein the first coherent light and the second coherent light are emitted simultaneously to illuminate the eyebox with a plurality of wavelengths simultaneously.

12. The eye-tracking method of claim 10, wherein the eyebox region is illuminated by the second coherent light subsequent to being illuminated by the first coherent light to illuminate the eyebox with a plurality of wavelengths.

13. The eye-tracking method of claim 10, wherein the first coherent light is emitted by a first light source of a first optical cavity of a first SMI sensor, and wherein the first SMI signal is generated by a first light sensor optically coupled to the first optical cavity of the first SMI sensor, and wherein the second coherent light is emitted by a second light source of a second optical cavity of a second SMI sensor, and wherein the second SMI signal is generated by a second light sensor optically coupled to the second optical cavity of the second SMI sensor.

14. The eye-tracking method of claim 13, wherein the first coherent light illuminates a first eyebox location, and wherein the second coherent light illuminates a second eyebox location that is different from the first eyebox location.

15. The eye-tracking method of claim 10, wherein the first coherent light is emitted by a swept-source laser of an SMI sensor during a first time period, and wherein the first SMI signal is generated by a light sensor optically coupled to a swept-source optical cavity of the SMI sensor, and wherein the second coherent light is emitted by the swept-source laser during a second time period subsequent to the first time period, and wherein the second SMI signal is generated by the light sensor.

16. The eye-tracking method of claim 15, wherein the first coherent light illuminates a first eyebox location, and wherein the second coherent light also illuminates the first eyebox location.

17. The eye-tracking method of claim 10, wherein the first wavelength and the second wavelength are near-infrared light.

18. A device comprising:
a self-mixed interferometer (SMI) including:
   a swept-source laser including an optical cavity configured to emit laser light toward a target; and
   a light sensor optically coupled to the optical cavity of the swept-source laser; and
processing logic configured to:
   drive the swept-source laser to emit a first wavelength of the laser light;
   measure a first SMI signal generated by the light sensor in response to first feedback light received back from the target;
   drive the swept-source laser to emit a second wavelength of the laser light, the second wavelength differing from the first wavelength;
   measure a second SMI signal generated by the light sensor in response to second feedback light received back from the target; and
   generate target data in response to at least the first SMI signal and the second SMI signal.

19. The device of claim 18, wherein the first feedback light is a portion of the first wavelength of the laser light received back from the target, and wherein the second feedback light is a portion of the second wavelength of the laser light received back from the target.

20. The device of claim 18, wherein the first wavelength and the second wavelength are near-infrared light.

\* \* \* \* \*